(12) United States Patent
Chen et al.

(10) Patent No.: US 11,433,571 B2
(45) Date of Patent: Sep. 6, 2022

(54) MOVABLE MOLD INSERT ADJUSTER

(71) Applicant: Hewlett-Packard Development Company, L.P., Fort Collins, CO (US)

(72) Inventors: Chien-Hua Chen, Corvallis, OR (US); Jimmy Perez, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 144 days.

(21) Appl. No.: 16/772,309

(22) PCT Filed: Feb. 6, 2019

(86) PCT No.: PCT/US2019/016838
§ 371 (c)(1),
(2) Date: Jun. 12, 2020

(87) PCT Pub. No.: WO2020/162925
PCT Pub. Date: Aug. 13, 2020

(65) Prior Publication Data
US 2021/0221029 A1 Jul. 22, 2021

(51) Int. Cl.
| | |
|---|---|
| *B29C 33/30* | (2006.01) |
| *B41J 2/14* | (2006.01) |
| *B29C 33/00* | (2006.01) |
| *B29C 33/14* | (2006.01) |
| *B29C 33/42* | (2006.01) |
| *B29C 39/10* | (2006.01) |
| *B29K 63/00* | (2006.01) |
| *B29L 31/00* | (2006.01) |

(52) U.S. Cl.
CPC ........ *B29C 33/308* (2013.01); *B29C 33/0022* (2013.01); *B29C 33/14* (2013.01); *B29C 33/303* (2013.01); *B29C 33/306* (2013.01); *B29C 33/307* (2013.01); *B29C 33/42* (2013.01); *B29C 39/10* (2013.01); *B29K 2063/00* (2013.01); *B29L 2031/7678* (2013.01)

(58) Field of Classification Search
CPC . B29C 33/0022; B29C 33/308; B29C 33/306; B41J 2/1433; H01L 21/565
USPC ......................................................... 425/195
See application file for complete search history.

(56) References Cited

U.S. PATENT DOCUMENTS

| | | | | |
|---|---|---|---|---|
| 4,867,668 A | * | 9/1989 | Miyairi | ............... B29C 45/2675 |
| | | | | 425/408 |
| 5,344,600 A | * | 9/1994 | McShane | .......... B29C 45/14655 |
| | | | | 264/272.17 |
| 7,182,434 B2 | | 2/2007 | Silverbrook | |
| 7,497,677 B1 | * | 3/2009 | Chan | ..................... B29C 33/306 |
| | | | | 425/185 |
| 7,691,676 B1 | * | 4/2010 | Fan | ......................... H01L 24/97 |
| | | | | 438/126 |

(Continued)

FOREIGN PATENT DOCUMENTS

| | | |
|---|---|---|
| CN | 104221469 | 12/2014 |
| DE | 102012018242 B4 | 5/2015 |

(Continued)

*Primary Examiner* — Robert B Davis
(74) *Attorney, Agent, or Firm* — HP Inc. Patent Department

(57) ABSTRACT

A mold assembly may include a mold frame having an opening extending in a plane and a movable mold insert adjuster to move a mold insert having a slot forming protrusion within the plane within opening.

15 Claims, 9 Drawing Sheets

(56) References Cited

U.S. PATENT DOCUMENTS

| | | |
|---|---|---|
| 7,901,196 B2 | 3/2011 | Narasimalu |
| 8,235,500 B2 | 8/2012 | Nystrom |
| 8,338,236 B1 | 12/2012 | Low |
| 2007/0243277 A1 | 10/2007 | Tsai |
| 2011/0292126 A1 | 12/2011 | Nystrom |
| 2016/0009085 A1 | 1/2016 | Chen |
| 2016/0023462 A1 | 1/2016 | Chen |
| 2018/0085983 A1* | 3/2018 | Osborne ............... B29C 45/376 |

FOREIGN PATENT DOCUMENTS

| | | |
|---|---|---|
| JP | H0939040 A | 2/1997 |
| JP | 3168742 B2 | 5/2001 |
| WO | WO-2014133561 A1 | 9/2014 |

* cited by examiner

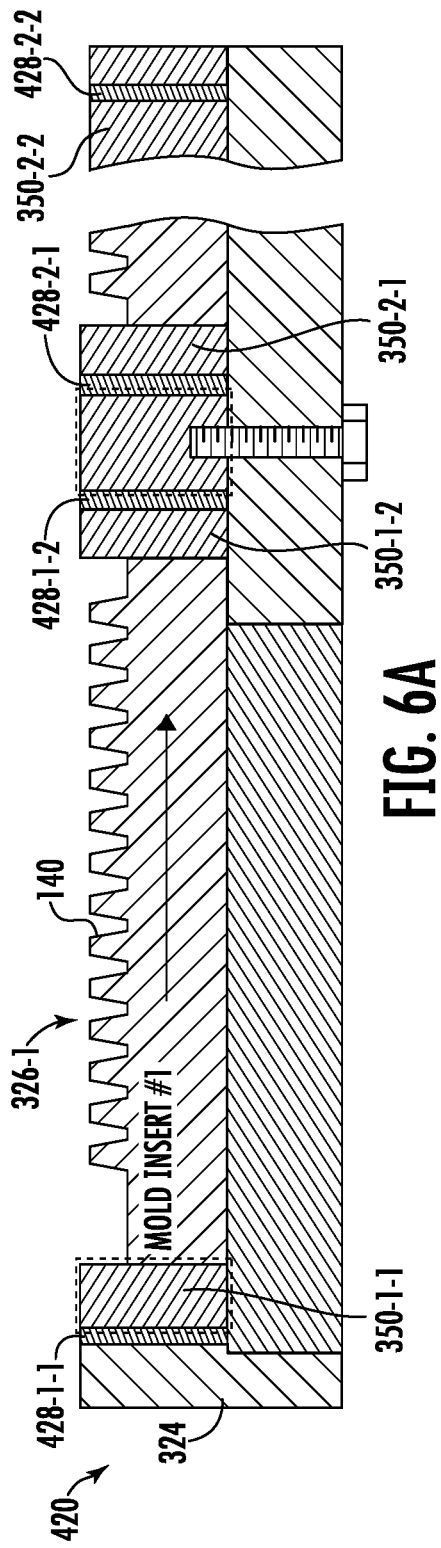
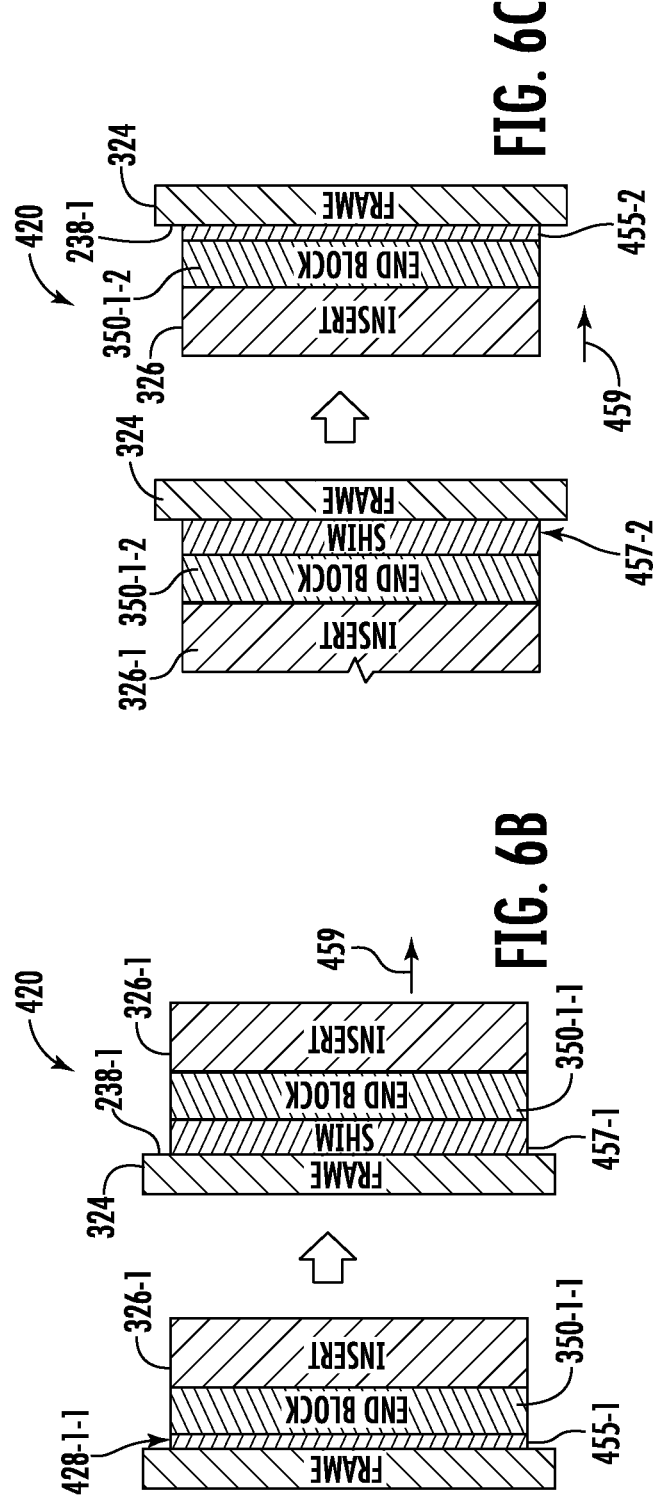

MOVABLE MOLD INSERT ADJUSTER

BACKGROUND

Some fluid ejection devices comprise fluid ejection dies which are embedded in a molding in which slots are formed. The fluid ejection dies are supplied with fluid through the slots. The slots may be molded into the molding.

BRIEF DESCRIPTION OF THE DRAWINGS

FIG. 6A is a sectional view illustrating portions of an example mold assembly.

FIG. 6B is a sectional view illustrating repositioning of an example mold insert of the mold assembly of FIG. 6A.

FIG. 6C is a sectional view illustrating repositioning of the example mold insert of the mold assembly of FIG. 6B.

Figure 1:
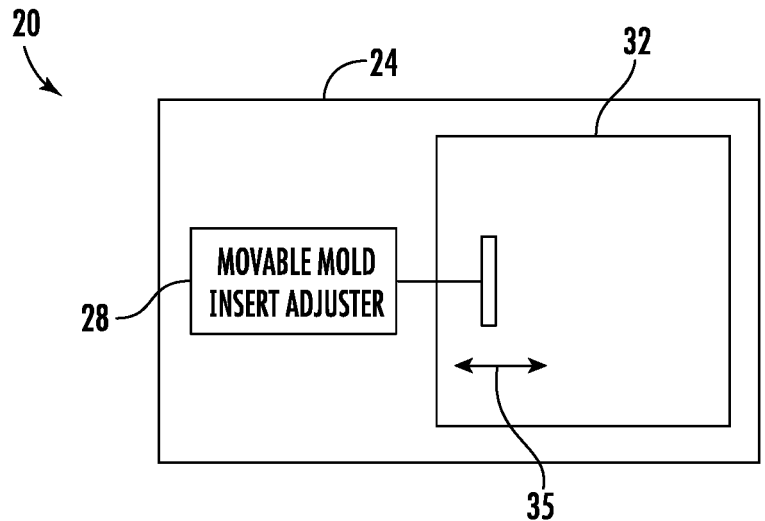
FIG. 1 is a top view schematic illustrating portions of an example mold assembly for molding a fluid ejection device.

Throughout the drawings, identical reference numbers designate similar, but not necessarily identical, elements. The Figs. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example mold assemblies and fluid ejection device molding methods that facilitate more efficient and lower cost molding of fluid supply slots for supplying fluid to individual fluid ejection dies. The disclosed mold assemblies and fluid ejection device molding methods facilitate repositioning of a mold insert, which forms the slots, relative to the dies to accommodate variations in dimensioning of the mold insert and/or the layout of the dies. As a result, the mold insert and its protrusions, which form the slots, may be more precisely aligned with respect to the fluid ejection dies. Such enhanced alignment may reduce mold flashing and may increase quality and production efficiency.

As fluid ejection dies have become smaller and smaller, manufacturing variances or tolerances with respect to the dimensions of the mold insert that forms the slots make up a larger percentage of the overall size of such fluid ejection dies. Even a relatively small variance in the dimensions of a mold insert may result in substantial misalignment of the slots being molded and supplying fluid to the fluid ejection dies. The disclosed mold assemblies and fluid ejection device molding methods utilize a movable mold insert adjuster that moves the mold insert within the plane containing the opening of a mold frame to accommodate variations in the dimensions of the mold insert.

In one implementation, the movable mold insert adjuster moves the mold insert with the slot forming protrusions without adjusting a size or location of the opening in a mold frame or chase. In another implementation, the movable mold insert adjuster moves the mold insert along with at least one internal side of the opening in the mold frame containing the mold insert. For example, in one implementation, the movable mold insert adjuster moves end blocks on opposite sides of the mold opening which in turn move the mold insert captured between the end blocks.

In one implementation, the movable mold insert adjuster comprises replaceable or interchangeable spacing members in the form of shims or pins. The shims may have different thicknesses, wherein differently sized shims may be placed between an end block and a portion of the frame to differently space the internal sides of the frame opening and the abutting edge of the insert from the internal sides of the frame opening. The pins are positionable within detents or bores in the frame or a base that supports the mold insert. The pins may be mounted in place relative to the frame to retain a mold insert. The different interchangeable pins have different diameter heads, wherein sides of the heads abut an end block that is in abutting engagement with the mold insert or directly about the mold insert itself.

In another implementation, the movable mold insert adjuster may comprise a wedge-shaped end block and a corresponding abutting wedge, wherein the wedge may be slid relative to and along the end block to move the side of the end block in abutment with the mold insert towards or away from the internal side of the frame opening. In one implementation, the wedge may be moved by a linear actuator such as piezo actuator.

In one implementation, the movable mold insert adjuster may comprise an end block and at least one cam, wherein movement of the cam moves the end block and the abutting mold insert towards or away from interior sides of the frame opening. For example, in one implementation, the cam may comprise an oval-shaped pin having sides in abutment with the end block, wherein the pin is selectively rotatable by at least one rotary actuator to move and retain the end block and abutting mold insert in place at different spacings or positions relative to the internal sides of the frame opening.

In each of such implementations, a movable mold insert adjuster may be provided at opposite ends or sides of the frame opening containing the mold insert to retain the mold insert in place at a selected position. In other implementations, a bias may be provided at one side of the mold insert, captured between the mold insert and the internal sides of the frame opening, wherein a single movable mold insert adjuster repositions the mold insert (and possibly the end block) by moving the mold insert (and possibly the end block) against the bias. In one implementation, the bias may comprise a compression spring. In other implementations, the bias may comprise a tension spring.

Disclosed herein is a mold assembly. The mold assembly may include a mold frame and a movable mold insert adjuster. The mold frame has an opening extending in a plane. The movable mold insert adjuster is to move a mold insert having a slot forming protrusion within the plane within opening.

Disclosed herein is a fluid ejection device molding method. The method may include positioning a mold frame having an opening extending in a plane over a fluid ejection die having a fluid passage. A mold insert having a slot forming protrusion is moved within the plane within the opening. A mold material supplied into the opening about the slot forming protrusion while opposite sides of the mold insert are positionally retained within the plane by a movable mold insert adjuster such that a slot forming protrusion of the mold insert overlies the fluid passage.

Disclosed herein is a mold assembly. The mold assembly may include a mold frame having a first opening extending in a first plane and a second opening spaced from the first opening and extending in a second plane coextensive with the first plane. The assembly may further include a first mold insert, a second mold insert, a first movable mold insert adjuster and a second movable mold insert adjuster. The first is located within the first opening and has a first plurality of parallel slot forming protrusions. The second mold insert is position within the second opening and has a second plurality of parallel slot forming protrusions. The first movable mold insert adjuster is to adjust a positioning of the first mold insert within the first opening and within the first plane. The second movable mold insert adjuster is to adjust positioning of the second mold insert within the second opening and within the second plane, independent of movement of the first mold insert.

FIG. 1 is a top view schematically illustrating portions of an example mold assembly 20. Mold assembly 20 facilitates repositioning of a mold insert, which forms the slots, relative to the dies to accommodate variations in dimensioning of the mold insert and/or the layout of the dies. As a result, the mold insert and its protrusions, which form the slots, may be more precisely aligned with respect to the fluid ejection dies.

Such enhanced alignment may reduce mold flashing and may increase production quality and efficiency. Mold assembly 20 comprises mold frame 24 and movable mold insert adjuster 28.

Mold frame 24, sometimes referred to as a chase, comprises a body having an opening 32 into which a molten material is deposited for forming a molding or molded structure. Opening 32 extends in a plane, is contained within the plane, and is to receive a mold insert having slot forming protrusions about which the molten material fills and which form slots in communication fluid feed passages of fluid ejection dies. In one implementation, mold frame 24 is formed from a first material that retains its shape while the molten material is received within opening 32. In one implementation, mold frame 24 is formed from a metal, such as steel, whereas the molten material comprises a polymeric material such as an epoxy mold compound.

Movable mold insert adjuster 28 comprises a mechanism to physically adjust or move the mold insert within the plane as indicated by arrows 35 within opening 32. Movable mold insert adjuster 28 facilitates movement of the mold insert and retention of the mold insert in a selected position relative to fluid ejection dies to facilitate enhanced alignment of the to be formed slots with respect to the underlying fluid ejection dies. In one implementation, movable mold insert adjuster 28 is directly connected to the mold insert. In another implementation, the movable mold insert adjuster 28 is indirectly coupled to the mold insert by an intervening end block.

In one implementation, the movable mold insert adjuster 28 comprises replaceable or interchangeable shims having different thicknesses, wherein differently sized shims may be placed between an end block and a portion of the frame to differently space the internal sides of the frame opening in the abutting edge of the insert from the internal sides of the frame opening. In another implementation, the movable mold insert adjuster 28 may comprise a wedge-shaped end block and a corresponding abutting wedge, wherein the wedge may be slid relative to and along the end block to move the side of the end block in abutment with the mold insert towards or away from the internal side of the frame opening. In one implementation, the wedge may be moved by a linear actuator such as piezo actuator.

In one implementation, the movable mold insert adjuster 28 may comprise an end block and at least one cam, wherein movement of the cam moves the end block and the abutting mold insert towards or away from interior sides of the frame opening. For example, in one implementation, the cam may comprise an oval-shaped pin having sides in abutment with the end block, wherein the pin is selectively rotatable to move and retain the end block and abutting mold insert in place at different spacings or positions relative to the internal sides of the frame opening. In another implementation, the movable mold insert may comprise different interchangeable pins positionable within detents or bores in the frame or a base that supports the mold insert. The different interchangeable pins have different diameters, wherein sides of the pins abut an end block that is in abutting engagement with the mold insert or directly abut the mold insert itself.

Figure 2A:
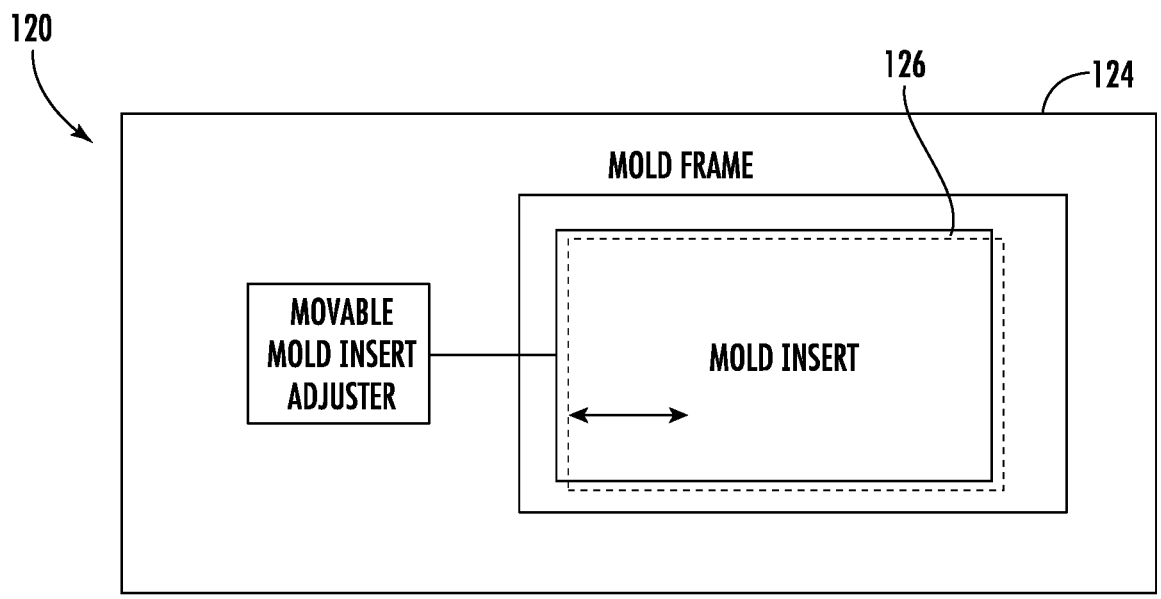
FIG. 2A is a top view schematically illustrating portions of an example mold assembly for molding a fluid ejection device.
Figure 2B:
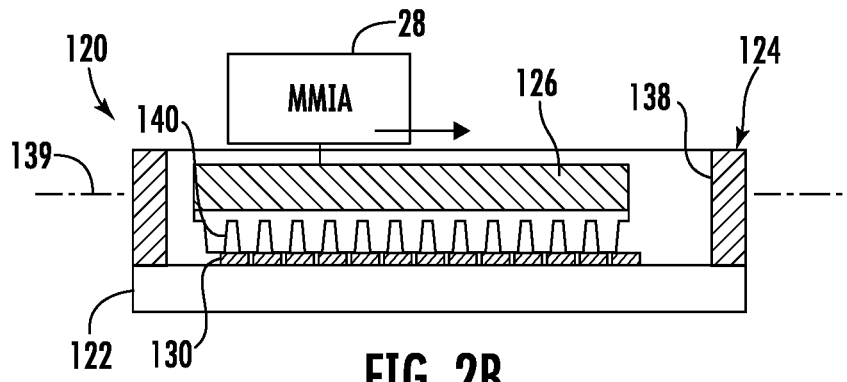
FIG. 2B is a sectional view of the mold assembly of FIG. 2A illustrating an example mold insert in a first position relative to underlying fluid ejection dies.
Figure 2C:
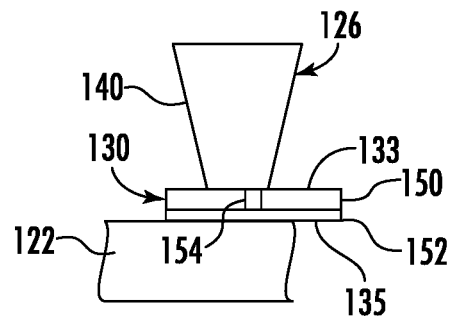
FIG. 2C is an enlarged sectional view of a portion of the mold assembly of FIG. 2B.

FIG. 2A-2E illustrate portions of an example mold assembly 120. FIG. 2A is a top view schematically illustrating portions of the example mold assembly 120. FIG. 2B is a sectional view of mold assembly 120 with a mold insert in a first position relative to an underlying set of fluid ejection dies. FIG. 2C is an enlarged view illustrating one of the example protrusions of the mold insert of FIG. 2B in a first position with respect to an example fluid ejection die. FIG.

2D is a sectional view of the mold assembly 120 with the mold insert being repositioned to a second position relative to the underlying set of fluid ejection dies. FIG. 2E is an enlarged view illustrating the example protrusion of the mold insert of FIG. 2D moved into alignment with the example fluid ejection die. As shown by such figures, mold assembly 120 comprises base 122, mold frame 124, mold insert 126 and mold insert adjuster 28 (described above).

Base 122 comprises fluid ejection die retainer, a structure for supporting and retaining a set of fluid ejection dies 130. In one implementation, base 122 comprises a release tape supporting and retaining the set of fluid ejection dies 130 opposite and within opening 138 of mold frame 124. In other implementations, base 122 may comprise other structures for supporting retaining fluid ejection dies 130 within opening 138 or opposite opening 138.

Mold frame 124 is similar to mold frame 24 described above. Mold frame 124 is securable in place above base 122 with the fluid ejection dies 130 supported by base 122 within opening 138. Opening 138 receives mold insert 126. Opening 138 extends within a plane 139 is generally parallel to the plane containing the set of fluid ejection dies 130 and the plane containing base 122.

Mold insert 126 comprise a structure having slot forming protrusions 140. Slot forming protrusions 140 have a shape and size corresponding the shape and size of the slots to be formed by the mold material to subsequently fill opening 138. In the example illustrated, slot forming protrusions 140 are parallel to one another and have tapering profiles. In other implementations, slot forming protrusions 140 may have other arrangements and may have other profiles. Slot forming protrusions 140 are to be positioned against back surfaces 131 of respective fluid ejection dies 130 such that the subsequently formed slot extends completely to the back surface 133 of its respective fluid ejection die 130.

As shown by FIG. 2C, each fluid ejection die 130 may comprise a substrate 150 supporting a thin film of electronics, such as fluid actuators (thermal resistors for example), a thin film fluidics layer 152 forming ejection chambers and ejection orifices, and a fluid passage 154 extending through substrate 150 to supply fluid from the molded slot to the fluid ejection chambers within layer 152. Each fluid ejection die 130 may additionally comprise electrical contact pads by which electrical power and signals are transmitted to the fluid actuators supported on substrate 150. In one implementation, the dies 130 may be of relatively small width, for example having a ratio of length to width of 20 or more, and in some implementations, 30 or more, 40 or more or 50 or more. Such dies may be called "slivers". The dies may also be relatively thin, for example generally consisting of a bulk silicon substrate and a thin film fluidics layer.

As shown by FIGS. 2B and 2C, due to dimensional variations in mold insert 126, the fluid ejection dies 130 or the layout of fluid ejection dies 130, slot forming protrusions 140 may be out of alignment with their respective fluid ejection dies 130. For example, the centerline of protrusion 140 does not coincide with the centerline of passage 154. In addition, the centerline of protrusion 140 does not coincide with the centerline of die 130. As a result, ends of die 130 may rise response to the force applied by protrusion 140, possibly allowing the incursion of the molding material between base 122 and the fluid ejecting face 135 of the fluid ejection die 130, wherein such flashing may detrimentally impact the performance of the fluid ejection died 130.

Figure 2D:
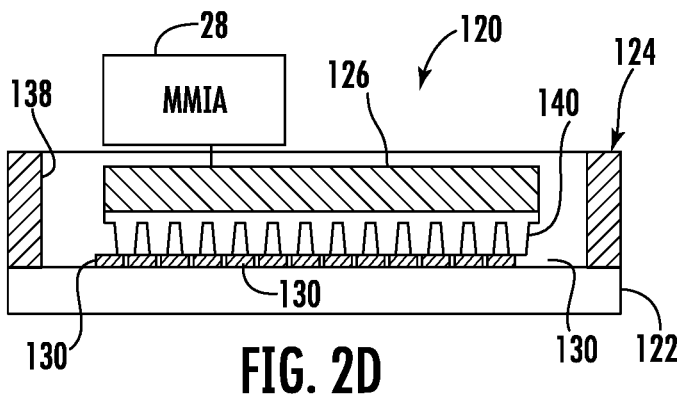
FIG. 2D is a sectional view of the mold assembly of FIG. 2A illustrating the example mold insert in a second position relative to the underlying fluid ejection dies.
Figure 2E:
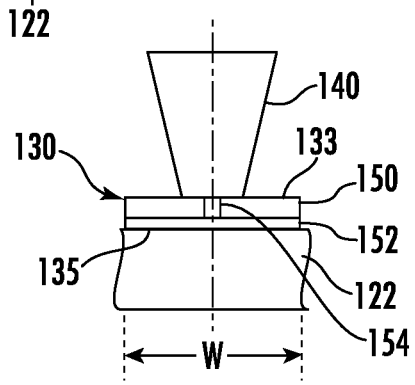
FIG. 2E is an enlarged sectional view of a portion of the mold assembly of FIG. 2D.

FIGS. 2D and 2E illustrate the repositioning of mold insert 126 in each of protrusions 140 by mold insert adjuster 28. FIGS. 2D and 2E illustrate the protrusions 140 positioned into enhanced alignment with the respective underlying fluid ejection dies 130. In the example illustrated, the centerline of protrusion 140 coincides with the centerline of fluid passage 154. In addition, the centerline of protrusion 140 coincides with the centerline of fluid ejection die 130, the centerline of die 130 being equidistantly spaced from the edges of die 130 by one-half the width W of die 130.

Figure 3:
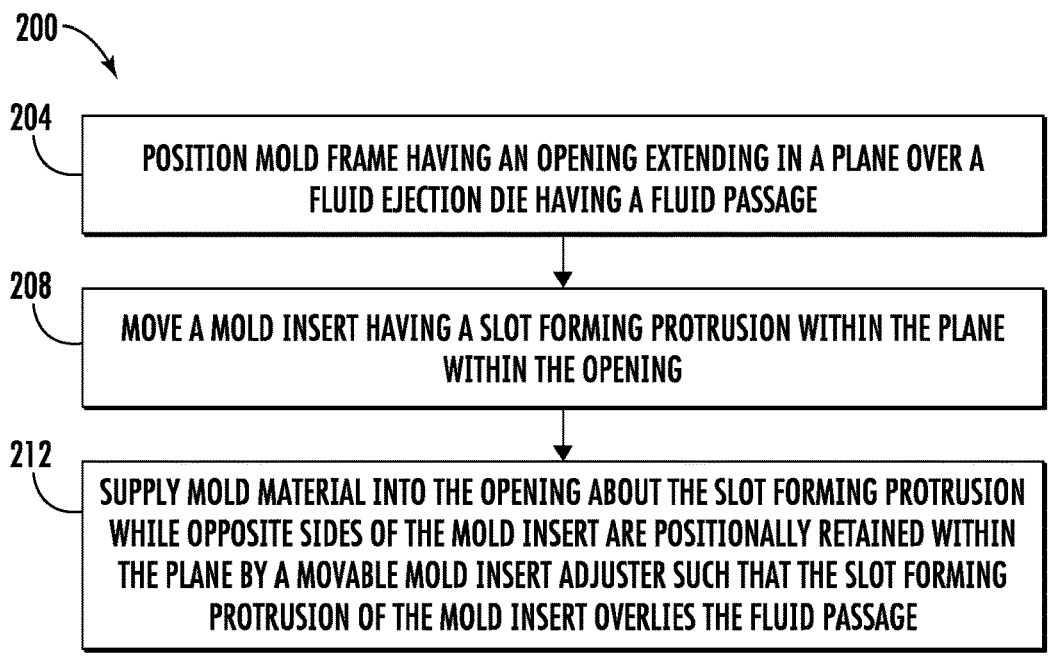
FIG. 3 is a flow diagram of an example fluid ejection device molding method.

FIG. 3 is a flow diagram of an example fluid ejection device molding method 200. Method 200 facilitates repositioning of a mold insert, which forms the slots, relative to the dies to accommodate variations in dimensioning of the mold insert and/or the layout of the dies. As a result, the mold insert and its protrusions, which form the slots, may be more precisely aligned with respect to the fluid ejection dies. Such enhanced alignment may reduce mold flashing and may increase production efficiency. Although method 200 is described in the context of being carried out by mold assembly 120, it should be appreciated that method 200 may likewise be carried out with other mold assemblies described hereafter or similar mold assemblies.

As indicated by block 204, mold frame 124 having opening 132 extending in a plane 139 is positioned over a fluid ejection die 130 having a fluid passage 134. In one implementation, the fluid ejection die is received within the opening 132. As indicated by block 208, a mold insert having a slot forming protrusion is moved within the plane within the opening. In one implementation, the mold insert is positioned prior to positioning of the fluid ejection dies within the opening. In another implementation, the mold insert is moved following positioning of the fluid ejection dies within the opening, but prior to contact of the mold insert with the fluid ejection dies. In yet another implementation, the mold insert is moved while in contact with the fluid ejection dies.

As indicated by block 212, a liquid mold material, such as an epoxy mold compound, is supplied into the opening 138 about the slot forming protrusion 140. Opposite sides of the mold insert 126 are positionally retained within the plane by movable mold insert adjuster 28 such that the slot forming protrusion of the mold insert overlies the fluid passage. Following block 212, and following solidification and/or curing of the mold material, the mold insert is removed, resulting in a slot being molded into the molding material and extending into fluid communication with the fluid passage of the fluid ejection die. In one implementation, multiple slots are concurrently molded with respect to respective fluid ejection dies 130.

FIGS. 4A-4D illustrate portions of an example mold assembly 220. Mold assembly 220 is similar to mold assembly 120 described above except that mold assembly 220 comprises a pair of end blocks 250-1 and 250-2 (collectively referred to as end blocks 250) which are each moved by respective movable mold insert adjusters 28-1 and 28-2 (collectively referred to as adjusters 28). The remaining components of mold assembly 220 which correspond to components of mold assembly 120 are numbered similarly.

End blocks 250 extend on opposite sides of mold insert 126. End blocks 250 abut opposite edges of insert 126. End blocks 250 form interior sides of the volume containing insert 126 which is filled with mold material during the molding of the molding that partially encapsulates fluid ejection dies 130 and in which slots connected to the individual dies 130 are formed.

Movable mold insert adjusters 28 are operably coupled to insert 126 to move insert 126. Movable mold insert adjusters 28 move or reposition their respective end blocks 250. In the example illustrated, movable mold insert adjuster 28-1 repositions and retains end block 250-1. In a similar manner, movable mold insert adjuster 28-2 repositions and retains end block 250-2. As discussed above with respect to movable mold insert adjuster 28 in assembly 120, movable mold insert adjusters 28 in assembly 220 may comprise interchangeable differently sized shims, cooperating wedges, eccentric cams, and/or differently sized retaining pins. In one implementation, movable mold insert adjusters 28 move the mold insert in equal distances to the left or equal distances to the right (parallel to the plane containing the slot forming protrusions).

Figure 4A:
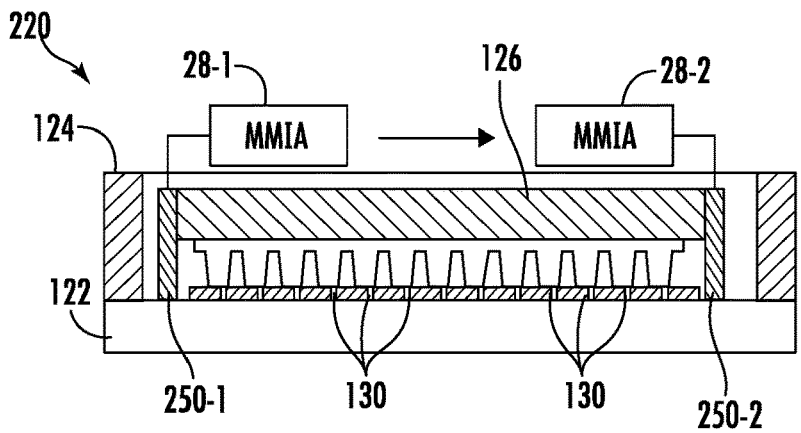
FIG. 4A is a sectional view of portions of an example mold assembly in a first position relative to underlying fluid ejection dies.
Figure 4B:
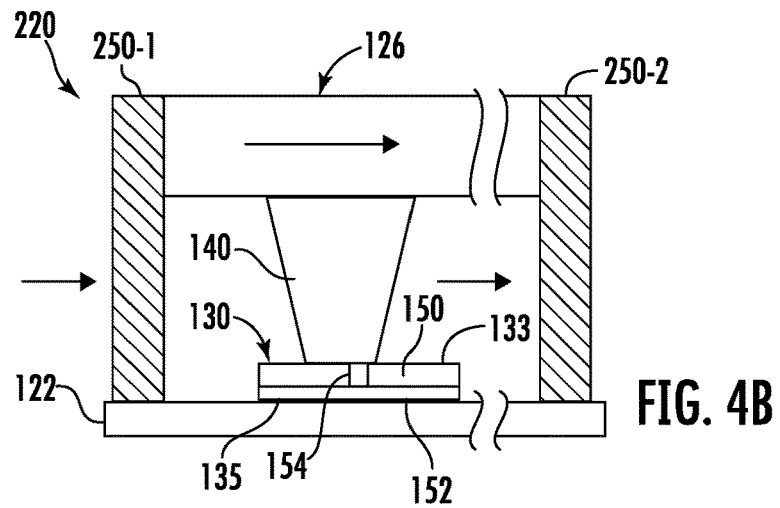
FIG. 4B is an enlarged sectional view of a portion of the mold assembly of FIG. 4A.

As shown by FIGS. 4A and 4B, due to dimensional variations in mold insert 126, the fluid ejection dies 130 or the layout of fluid ejection dies 130, slot forming protrusions 140 may be out of alignment with their respective fluid ejection dies 130. For example, the centerline of protrusion 140 does not coincide with the centerline of passage 154. In addition, the centerline of protrusion 140 does not coincide with the centerline of die 130. As a result, ends of die 130 may rise response to the force applied by protrusion 140, possibly allowing the incursion of the molding material between base 122 and the fluid ejecting face 135 of the fluid ejection die 130, wherein such flashing may detrimentally impact the performance of the fluid ejection died 130.

Figure 4C:
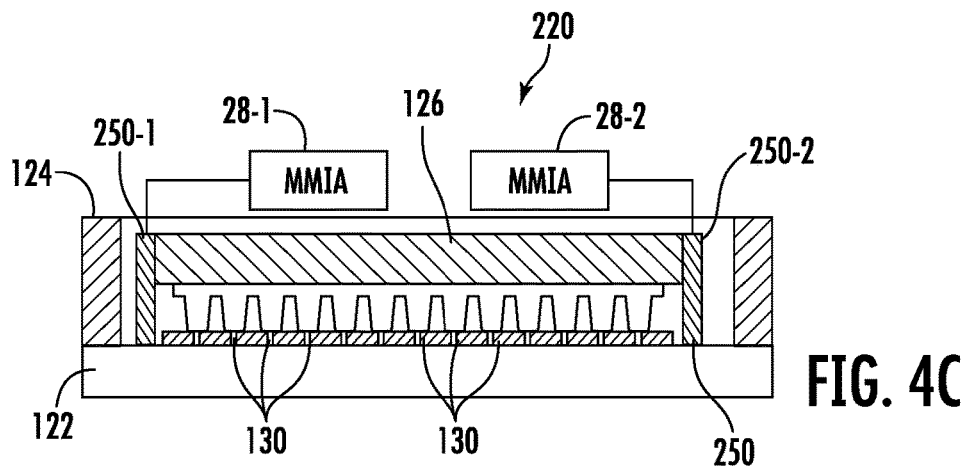
FIG. 4C is a sectional view of portions of the example mold assembly of FIG. 4A and a second position relative to the underlying fluid ejection dies.
Figure 4D:
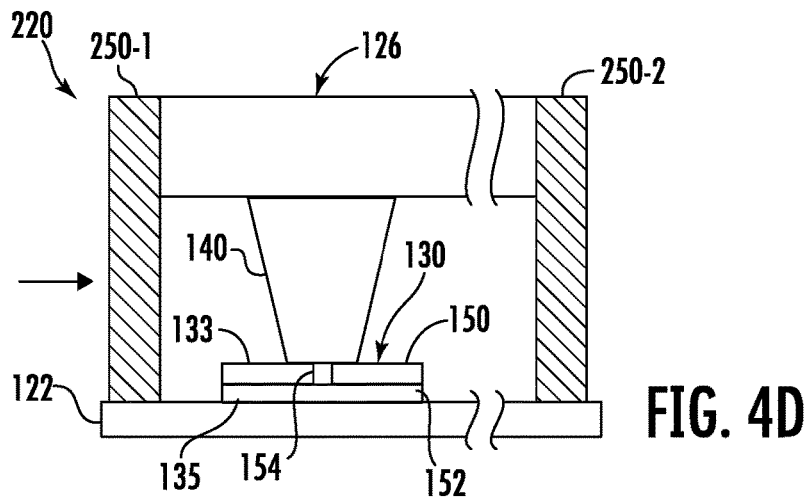
FIG. 4D is an enlarged sectional view of a portion of the mold assembly of FIG. 4C.

FIGS. 4C and 4D illustrate the repositioning of mold insert 126 in each of protrusions 140 by moving end blocks 250 and mold insert 126 with mold insert adjusters 28. FIGS. 4C and 4D illustrate the protrusions 140 positioned into enhanced alignment with the respective underlying fluid ejection dies 130. In the example illustrated, the centerline of protrusion 140 coincides with the centerline of fluid passage 154. In addition, the centerline of protrusion 140 coincides with the centerline of fluid ejection die 130, the centerline of die 130 being equidistantly spaced from the edges of die 130 by one-half the width W of die 130.

Figure 5:
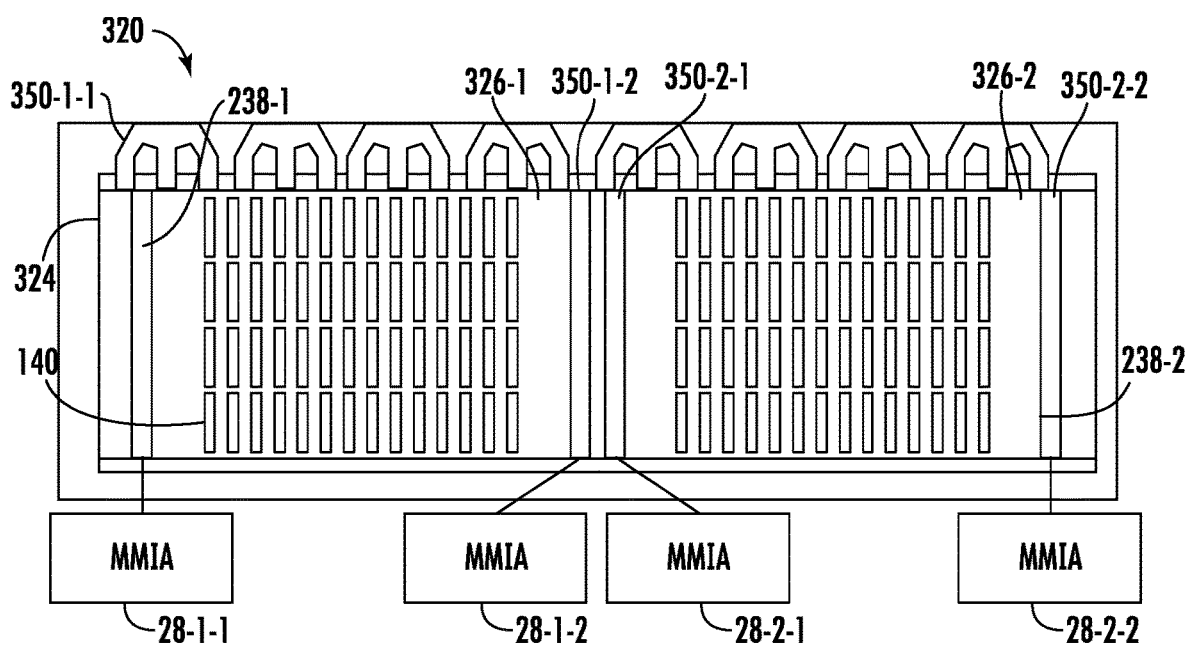
FIG. 5 is a top view illustrating portions of an example.

FIG. 5 is a top view illustrating portions of an example mold assembly 320. Mold assembly 320 comprises mold frame 324, mold inserts 326-1, 326-2 and movable mold insert adjusters 28-1-2, 28-1-2 (collectively referred to as adjusters 28-1), 28-2-1 and 28-2-2 (collectively referred to as adjusters 28-2). Mold frame 324 is similar to mold frame 124 described above except that mold frame 324 comprises a pair of openings 238-1 and 238-2 in which mold inserts 326-1 and 326-2 are received and extend within a plane.

As shown by FIG. 5, each of mold inserts 326-1 comprises a 4×14 array of protrusions 140, wherein each of such protrusions 140 has a length corresponding to a length of the fluid ejection die 130 (shown described above). In other implementations, each of mold inserts 326 may comprise other arrangements and numbers of protrusions 140 corresponding to a number of individual fluid ejection dies. In other implementations, mold frame 324 itself may include a single opening 238 or greater than two openings 238 for receiving a corresponding number of mold inserts 326.

Movable mold insert adjusters 28-1-1 and 28-1-2 are similar to and operate similarly to movable mold insert adjusters 28-1 and 28-2 in assembly 220. In particular, movable mold adjuster 28-1-1 moves end block 350-1-1 while movable mold insert adjuster 28-1-2 correspondingly moves end block 350-1-2 to move mold insert 326-1 within opening 238-1 to adjust the positioning of the protrusions 140 of mold insert 326-1 relative to the fluid ejection dies 130. Likewise, movable mold insert adjusters 28-2-1 and 28-2-2 are similar to and operate similarly to movable mold insert adjusters 28-1 and 28-2 in assembly 220. In particular, movable mold adjuster 28-2-1 moves end block 350-2-1 while movable mold insert adjuster 28-2-2 correspondingly moves end block 350-2-2 to move mold insert 326-2 within opening 238-2 to adjust the positioning of the protrusions 140 of mold insert 326-2 relative to the fluid ejection dies 130. Movement of mold insert 326-1 may be independent of movement of mold insert 326-2.

FIGS. 6A, 6B and 6C illustrate portions of an example mold assembly 420. Mold assembly 420 is similar to mold assembly 320 described above except that mold assembly 420 is specifically illustrated as comprising movable mold insert adjusters 428-1-1, 428-1-2 (collectively referred to as mold insert adjusters 428-1), 428-2-1 and 428-2-2 (collectively referred to as mold insert adjusters 428-2). The remaining components of mold assembly 420 which correspond to components of mold assembly 320 are numbered similarly.

FIGS. 6B and 6C illustrate the adjustment of the positioning of 326-1 by mold insert adjusters 428-1. It should be appreciated that mold insert adjusters 428-2 operate in a similar fashion. As shown by FIGS. 6B and 6C, mold insert adjusters 428-1 and 428-2 comprise interchangeable shims, wherein the different shims have different thicknesses. FIG. 6B illustrates a first shim 455-1 of movable mold insert adjuster 428-1-1 having a first thickness being replaced with a second shim 457-1 having a second thickness greater than the first thickness. The second shim 457-1 spaces end block 350-1-1 a greater distance from frame 324 to relocate mold insert 326-1 further to the right as indicated by arrow 459. FIG. 6C illustrates a first shim 457-2 of movable mold insert adjuster 428-1-2 having the second thickness being replaced with a second thinner shim 455-2 having the first thickness. The second thinner shim 455-2 spaces end block 350-1-2 a smaller distance from frame 324 to relocate mold insert 326-1 further to the right is indicated by arrow 459. In the example illustrated, shims 457-1 and 457-2 have similar thicknesses while shims 455-1 and 455-2 have similar thicknesses. As should be appreciated, this process may be reversed to alternatively move end walls 350-1 and mold insert 326-1 to the left.

Figure 7A:
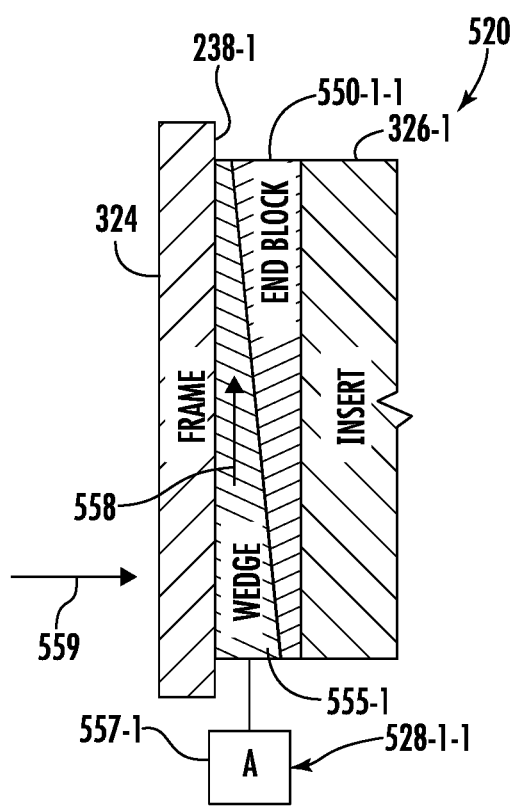
FIG. 7A is a sectional view illustrating repositioning of an example mold insert of the mold assembly of FIG. 6A.
Figure 7B:
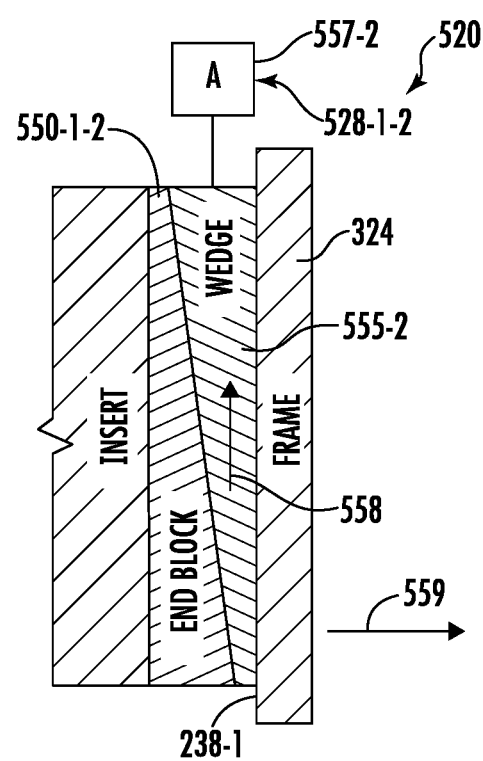
FIG. 7B is a sectional view illustrating repositioning of the example mold insert of the mold assembly of FIG. 6A.

FIGS. 7A and 7B are top views illustrating portions of an example mold assembly 520. Mold assembly 520 is similar to mold assembly 320 described above except that mold assembly 520 comprises end blocks 550-1-1 and 550-1-2 (collectively referred to as end blocks 550-1) on opposite ends or sides of opening 238-1 and movable mold insert adjusters 528-1-1 and 528-1-2 (collectively referred to as adjusters 528-1) on opposite sides or ends of opening 238-1. Although not illustrated, it should be appreciated that assembly 520 may include similar end blocks and movable mold insert adjusters for repositioning mold insert 326-2 within opening 238-2 (shown in FIG. 5).

End blocks 550-1 comprise wedge-shaped end blocks sandwiched between insert 326-1 and frame 324. Movable mold insert adjusters 528-1-1 and 528-1-2 comprise wedges 555-1, 555-2 and actuators 557-1, 557-2, respectively. Wedges 551-1 are sandwiched between end blocks 550-1-1 and frame 324. Actuator 557-1 is operably coupled to wedge 555-1 to slide wedge 555-1 relative to end block 550-1-1 so as to move end block 550-1-1 in a direction generally perpendicular to the direction in which the wedge is being moved. Similarly, Wedges 551-2 is sandwiched between end blocks 550-1-2 and frame 324. Actuator 557-2 is operably coupled to wedge 555-2 to slide wedge 555-2 relative to end block 550-1-2 so as to move end block 550-1-2 in a direction generally perpendicular to the direction in which the wedge is being moved. In the example illustrated, movement of wedge 555-1 by actuator 557-1 in the direction indicated by arrow 558 linearly moves end block 550-1-1 and mold insert 326-1 to the right in the direction indicated by arrow 559. Movement of wedge 555-2 by actuator 557-2 in the direction indicated by arrow 558 linearly moves end block 550-1-2 to the right in the direction indicated by arrow 559. Opposite movement of wedges 555-1 and 555-2 by such actuators 557-1 and 557-2 correspondingly moves end blocks 550-1-1 and 550-1-2 and insert 326-1 to the left.

In the example illustrated, wedges 555-1 and 555-2 have opposite ramp profiles. Likewise, end blocks 550-1-1 and 550-1-2 have opposite or mirroring ramp profiles. As a result, movement of wedges 555-1 and 555-2 in the same direction results in end blocks 550-1 both being moved is it to the left or to the right as seen in FIGS. 7A and 7B. In other implementations, wedges 555-1 and 555-2 may have the same ramp profiles. In such an implementation, movement of both of end blocks 550-1 in one direction is carried out by moving the two wedges in opposite directions.

Figure 8A:
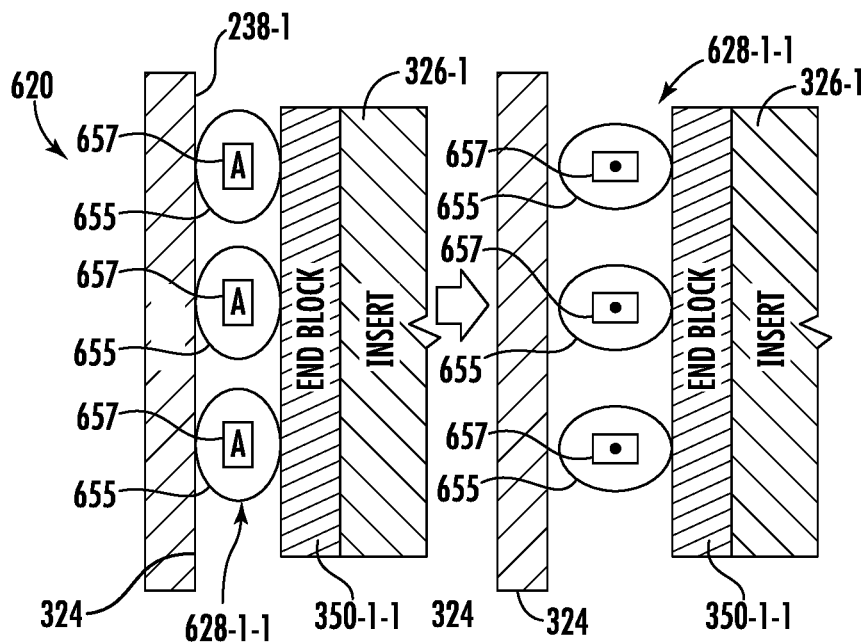
FIG. 8A is a top view illustrating repositioning of an example mold insert of the mold assembly of FIG. 6A.
Figure 8B:
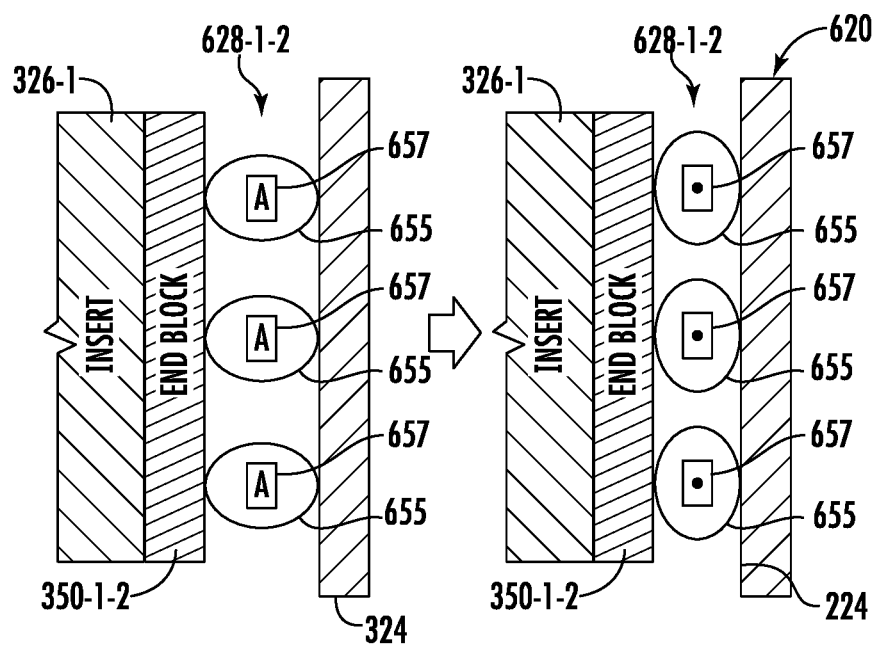
FIG. 8B is a top view illustrating repositioning of the example mold insert of the mold assembly of FIG. 6A.

FIGS. 8A and 8B are top views illustrating portions of an example mold assembly 620. FIG. 8A illustrates the left side of the mold insert 326-1 within opening 238-1 being moved to the right. FIG. 8B illustrates the right side of the mold insert 326-1 within opening 238-1 also being moved to the right. Mold assembly 620 is similar to mold assembly 320 described above except that mold assembly 520 comprises movable mold insert adjusters 628-1-1 and 628-1-2 (collectively referred to as adjusters 628-1) on opposite sides or ends of opening 238-1. Although not illustrated, it should be appreciated that assembly 620 may include similar movable mold insert adjusters for repositioning mold insert 326-2 within opening 238-2 (shown in FIG. 5).

Movable mold insert adjusters 628-1 comprise eccentric cams 655 and actuators 657 (schematically illustrated). Eccentric cams 655 comprise rotatable eccentric members, such as the illustrated oval columns, sandwiched between the respective end blocks 350-1-1 and 350-1-2 and frame 324. Actuators 657 comprise rotary actuators to selectively rotate the eccentric cams 655. As shown by FIG. 8A, actuators 657 may rotate cams 655 to increase the spacing between end block 350-1-1 and frame 324 so as to move end block 350-1-1 and insert 326-1 to the right. As shown by FIG. 8B, actuator 657 may rotate cams 655 to decrease the spacing between end block 350-1-2 and frame 324 so after correspondingly accommodate the movement of end block 350-2 and insert 326-1 to the right. As should be appreciated, this operation may be reversed to alternatively move such an blocks and mold insert 326-1 to the left as seen in FIGS. 8A and 8B. Although three distinct actuators 657 are illustrated for the three distinct cams 655, in other implementations a greater or fewer number of cams may be utilized. Moreover, in other implementations, a single actuator may rotatably drive more than one cam 655. In the example illustrated, such actuators 657 rotate cams 655 in unison.

Figure 9A:
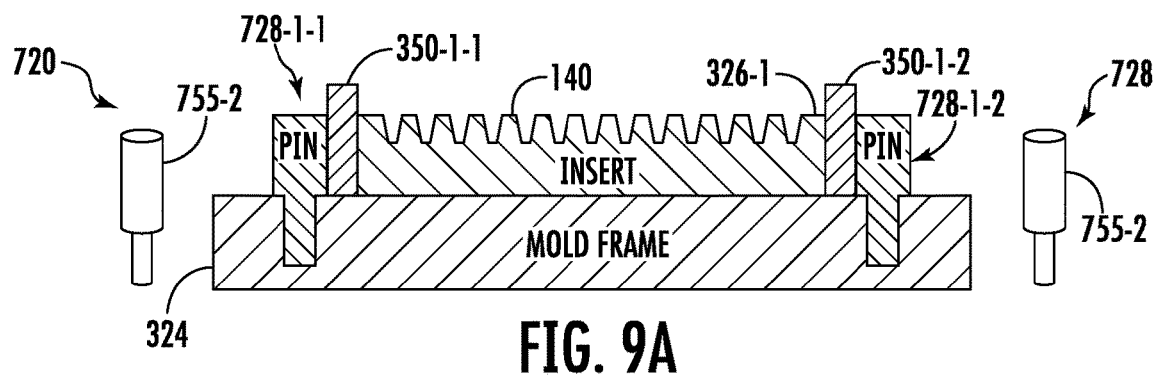
FIG. 9A is a sectional view illustrating portions of an example mold assembly with an example mold insert in a first position relative to an example mold frame.
Figure 9B:
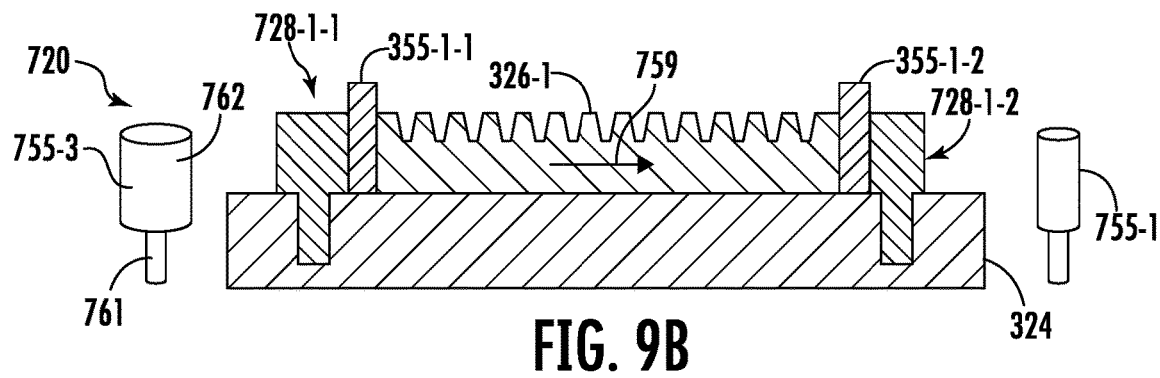
FIG. 9B is a sectional view illustrating portions of the example mold assembly of FIG. 9A with the example mold insert in a second position relative to the example mold frame.
Figure 9C:
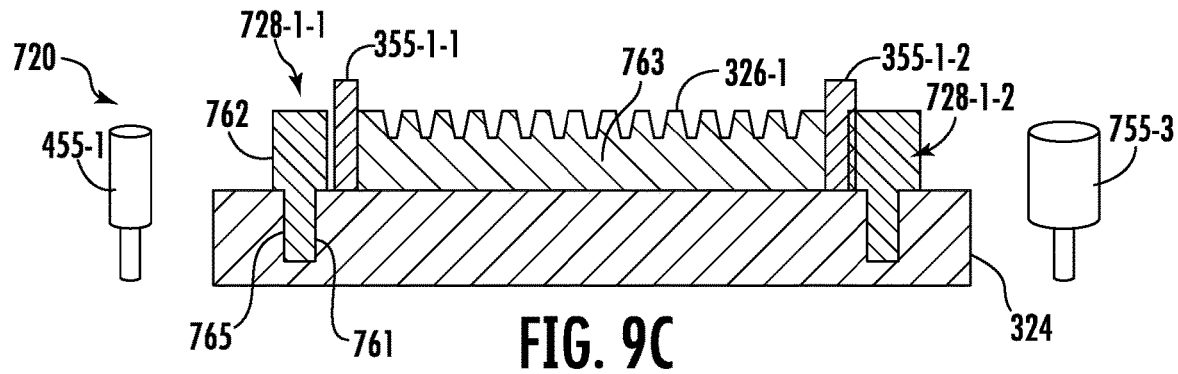
FIG. 9C is a sectional view illustrating portions of the example mold assembly of FIG. 9A with the example mold insert in a third position relative to the example mold frame.

FIGS. 9A-9C are sectional views illustrating portions of an example mold assembly 720. Mold assembly 720 is similar to mold assembly 420 described above except that assembly 720 utilizes a movable mold insert adjusters 728-1-1 and 728-1-2 in the form of retaining pins 755-1, 755-2 and 755-3 (collectively referred to as retaining pins 755) in place of shims 455-1 and 455-2. Retaining pins 755 each have an insertion portion 761 and a head portion 762. Insertion portion 761 is receivable within a similarly sized and shaped bore 765 provided in mold frame 324. Head portion 762 extends from insertion portion 761 and abuts an outer side of one of end blocks 355-1.

In the example illustrated, head portion 762 of retaining pins 755-1 has a smaller diameter as compared to the diameter of head portion 762 of retaining pins 755-2. Head portion 762 of retaining pins 755-2 has a diameter less than that of the head portion 762 of retaining pins 755-3. In the example illustrated, the diameter difference as between retaining pins 755-1 and 455-2 is equal to the diameter distance as between retaining pins 755-2 and 755-3.

In the example illustrated, at least two spaced retaining pins 755-2 are positioned along opposite sides of mold insert 326-1 with the end blocks 350-1 sandwiched between one of the retaining pins 455 and the mold insert 326-1. In other implementations, end blocks 350-1 may be omitted, wherein the head portion 762 of retaining pins 755 directly abut opposite edges of the mold insert 326-1.

FIGS. 9A-9C illustrate three different positions for mold insert 326-1. In the arrangement shown in FIG. 9A, assembly 720 utilizes retaining pins 755-2 on both opposite sides of mold insert 326-1 to retain mold insert 326-1 (and end blocks 350-1 when utilized) in the illustrated position. In the arrangement shown in FIG. 9B, retaining pin 755-3 is inserted on the left side of mold insert 326-1 of the smaller headed retainer pin 755-1 is inserted on the right side of mold insert 326-1. As a result, mold insert 326-1 is shifted to the right as indicated by arrow 759. In the arrangement shown in FIG. 9C, the larger headed retaining pin 755-3 is inserted on the right side of mold insert 326-1 while the smaller headed retainer pin 755-1 is inserted on the left side of mold insert 326-1. As a result, mold insert 326-1 is shifted to the left as indicated by arrow 763.

Although assembly 720 is illustrated as utilizing three differently sized retaining pins, it should be appreciated that assembly 720 may utilize a multitude of differently sized retainer pins which are complementary to one another in that both sets of pins on opposite sides of the mold insert 326-1 directly contact their respective end blocks 350-1 which are in direct contact with mold insert 326-1 or in that both sets of pins on opposite sides of the mold insert 326-1 directly contact mold insert 326-1. As a result, the differently sized retaining pins 755 control the positioning of mold insert 326-1 by contacting opposite edges of mold insert 326-1 or intervening structures, such as end plates 350-1, while still shifting mold insert 326-1 to the left or to the right in the plane of the opening formed between the sets of pins or in a direction generally parallel to the plane containing protrusions 140. Through the use of different sets of retaining pins having different complementary sizes, mold insert 326-1 may be repositioned into precise alignment with the underlying fluid ejection dies 130 and retained in place during the molding of the slots formed by protrusions 140.

Figure 10:
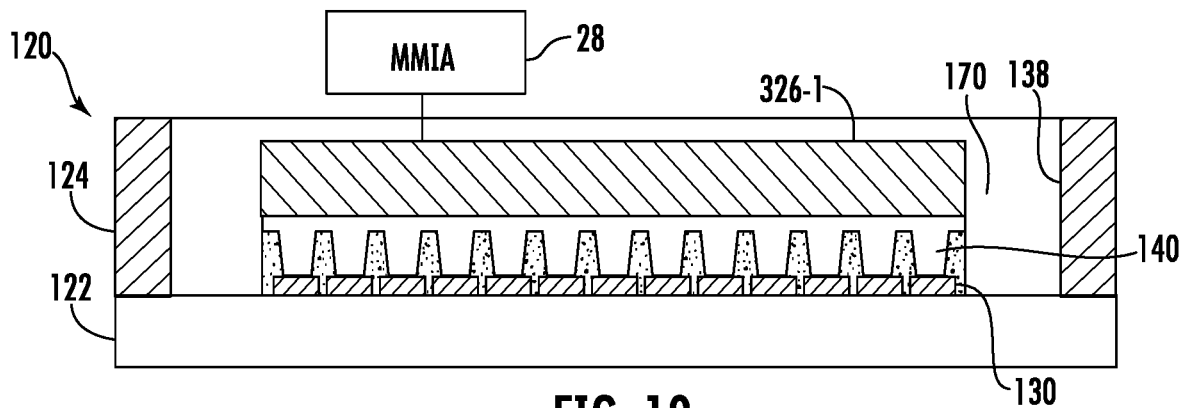
FIG. 10 is a sectional view illustrating the example mold assembly of FIG. 2D during filling of the mold assembly with mold material.

FIG. 10 is a sectional view illustrating the use of mold assembly 120 to mold material about protrusions 140 to at least partially encapsulate the fluid ejection dies 130 and to form the molded slots leading to the fluid passages 154 of the fluid ejection dies 130. FIG. 10 illustrates mold insert 326-1 positioned by movable mold insert adjuster 28 so as to be in enhanced alignment with fluid ejection dies 130. FIG. 10 further illustrates opening 40 being filled with a mold material 170 while the mold material is in a liquid or flowable state. Thereafter, the mold material is solidified, cured or hardened and mold insert 326 is withdrawn, leaving the fluid ejection device which may include multiple fluid ejection dies and multiple corresponding molded slots that supply fluid to fluid passages of the fluid ejection dies.

Although FIG. 10 illustrates mold assembly 120 during the molding of the mold material about the fluid ejection dies 130, mold assemblies 220, 320, 420, 520, 620 and 720 may likewise be used to form such a fluid ejection device. For example, in those mold assemblies that utilize an end wall, the mold material, such as epoxy mold compound, may be supplied into the volume between the end walls and about the protrusions 140 of mold insert 326-1 while the mold material is in a liquid or flowable state. Thereafter, the mold material may be solidified, cured and/or hardened and the mold insert 326-1 may be removed, leaving the formed fluid ejection device.

Figure 11:
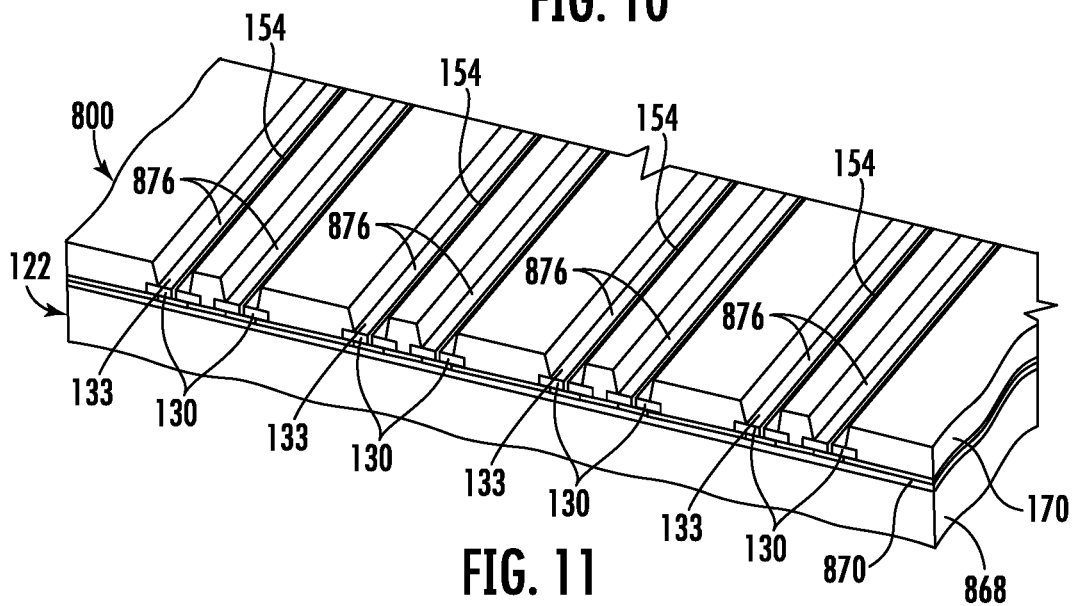
FIG. 11 is a perspective view of an example fluid ejection device following withdrawal of the example mold insert.

FIG. 11 illustrates portions of an example fluid ejection device 800 supported on base 122. Prior to molding, fluid ejection dies 130 is laminated onto carrier 868 with thermal released tape 870. Base 122 is then positioned opposite to an opening of the mold frame 124, 324. The movable mold insert adjusters 28, 428, 528, 628 or 728 then repositioned the mold insert 126, 326-1, 326-2 into enhanced alignment with the fluid ejection dies. Thereafter, the open spaces of the mold assembly are filled with mold material.

Following curing, hardening or solidifying of the mold material, the example mold insert 126, 326 (having a slightly different spacing of protrusions 140 is withdrawn, leaving the molded slots 876 in the solidified mold material 170. As shown by FIG. 11, the slots 876 extend through the mold material 170 and directly lead to fluid supply passage is 154 on the back surfaces 133 of the fluid ejection dies 130. Fluid ejection device 800 may be withdrawn and released from the release tape 870.

Figure 12:
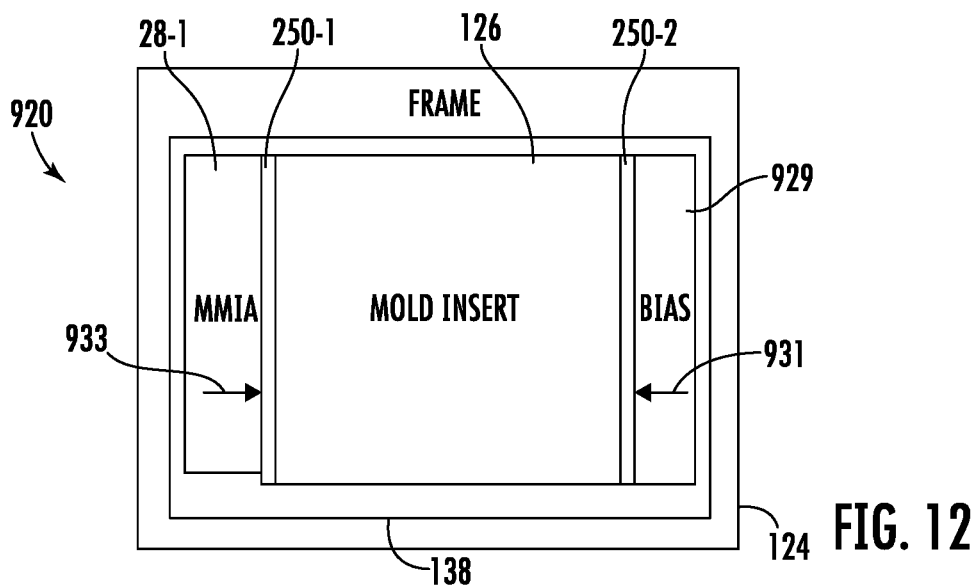
FIG. 12 is a top view schematically illustrating portions of an example mold assembly.

FIG. 12 is a top view schematically illustrating portions of an example mold assembly 920. Mold assembly 920 is similar to mold assembly 220 except that mold assembly 920 replaces movable mold adjuster 28-2 with bias 929. The remaining components of assembly 920 which correspond to components of mold assembly 220 are numbered similarly.

Bias 929 extends on an opposite side of mold insert 126 as movable mold insert adjuster 28-1. Movable mold insert adjuster 28-1 moves mold insert 126 by applying force to mold insert 126 in a direction that opposes bias 929. In one implementation, bias 929 may comprise at least one compression spring sandwiched between end block 250-2 and the interior sides of opening 138 of frame 124. In such an implementation, bias applies a force in the direction indicated by arrow 931. Movable mold insert adjuster 28-1 applies force to end block 250-1 which in turn applies force to mold insert 126 in the direction indicated by arrow 933 so as to move mold insert 126 in the direction indicated by arrow 933 against the force of bias 929. In other implementations, one or both of and blocks 250-1, 250-2 may be omitted, wherein bias 929 directly contacts and applies force to mold insert 126 or movable mold insert adjuster 28-1 directly contacts and applies force to mold insert 126. As should be appreciated, each of mold assemblies 320, 420, 520, 620 and 720 may alternatively include bias 929 on one side of mold insert 326 with end wall 350-1-2 sandwiched between bias 929 and mold insert 326-1, wherein the movable mold insert adjuster on the opposite side of mold insert 326-1, movable mold insert adjuster 428-1-1, 528-1-1, 628-1-1 or 728-1-1 moves and/or retains mold insert 326-1 in opposition to bias 329.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A mold assembly comprising:
a mold frame having an opening extending in a plane; and
a movable mold insert adjuster having replaceable or interchangeable shims having different thicknesses to differently space internal sides of the opening and to move a mold insert having a slot forming protrusion within the plane within the opening.

2. A mold assembly comprising:
a mold frame having an opening extending in a plane; and
a movable mold insert adjuster to move a mold insert having a slot forming protrusion within the plane within the opening,
wherein the movable mold insert adjuster comprises a first removable pin having a first diameter and mounted relative to the mold frame to retain the mold insert in place, the removable pin being interchangeable with a second removeable pin having a second diameter different than the first diameter.

3. A mold assembly comprising:
a mold frame having an opening extending in a plane;
a movable mold insert adjuster to move a mold insert having a slot forming protrusion within the plane within the opening,
wherein the movable mold insert adjuster comprises a pair of cooperating slidable wedges along a side of the opening and to be sandwiched between the mold frame and the mold insert.

4. The mold assembly of claim 3, wherein the movable mold insert adjuster comprises a rotatable asymmetric cam along a side of the opening and to be sandwiched between the mold frame and the mold insert.

5. The mold assembly of claim 3 further comprising a bias to exert a bias force in the plane, wherein the movable mold insert adjuster is to move the mold insert against the bias force.

6. A method comprising:
positioning mold frame having an opening extending in a plane over a fluid ejection die having a fluid passage;
moving a mold insert having a slot forming protrusion within the plane within the opening; and
supplying mold material into the opening about the slot forming protrusion while opposite sides of the mold insert are positionally retained within the plane by a movable mold insert adjuster such that a slot forming protrusion of the mold insert overlies the fluid passage.

7. The method of claim 6, wherein the moving of the mold insert comprises exchanging a first pair of spacing members on opposite sides of the mold insert sandwiched between the mold insert and the mold frame with a second pair of spacing members on the opposite sides of the mold insert and sandwiched between the mold insert and the mold frame.

8. The method of claim 6, wherein the moving of the mold insert comprises sliding a wedge sandwiched between the mold frame and the mold insert.

9. The method of claim 6, wherein the moving of the mold insert comprises rotating an asymmetric cam sandwiched between the mold frame and the mold insert.

10. A mold assembly comprising:
a mold frame having a first opening extending in a first plane and a second opening spaced from the first opening and extending in a second plane coextensive with the first plane;
a first mold insert within the first opening and having a first plurality of parallel slot forming protrusions;
a second mold insert within the second opening and having a second plurality of parallel slot forming protrusions;
a first movable mold insert adjuster to adjust a positioning of the first mold insert within the first opening and within the first plane;
a second movable mold insert adjuster to adjust a positioning of the second mold insert within the second opening and within the second plane, independent of movement of the first mold insert; and
a base connected to the mold frame, the base comprising a fluid ejection die retainer to retain a first fluid ejection die opposite the first mold insert and to retain a second fluid ejection die opposite the second mold insert.

11. The mold assembly of claim 2 further comprising:
a base connected to the mold frame, wherein the first removable pin and the second removable pin are removably mountable to the base on a first side of the mold insert; and
a third removable pin removably mountable to the base on a second side of the mold insert.

12. The mold assembly of claim 3, wherein the movable mold insert adjuster comprises an electrically powered linear actuator operably coupled to one of the cooperating slidable wedges to move said one of the cooperating slidable wedges relative.

13. The mold assembly of claim 4, wherein the movable mold insert adjuster comprises a rotary actuator operably coupled to the rotatable asymmetric cam.

14. The mold assembly of claim 4, wherein the rotatable asymmetric cam is on a first side of the movable mold insert, the mold assembly further comprising:
a second rotatable asymmetric cam on a second side of the movable mold insert, opposite the first side; and
the second rotary actuator operably coupled to the second rotatable asymmetric cam.

15. The mold assembly of claim 14, wherein the rotatable asymmetric cam has a first major dimension along a first axis and wherein the second rotatable asymmetric cam has a second major dimension along a second axis nonparallel to the first axis.

* * * * *